United States Patent [19]

Fukushima et al.

[11] Patent Number: 4,502,575
[45] Date of Patent: Mar. 5, 1985

[54] SHOCK ABSORBER

[75] Inventors: Naoto Fukushima, Fujisawa; Kazuroh Iwata, Kamakura; Kunihiko Hidaka, Yokohama, all of Japan

[73] Assignee: Nissan Motor Company, Limited, Yokohama, Japan

[21] Appl. No.: 285,999

[22] Filed: Jul. 23, 1981

[30] Foreign Application Priority Data

Aug. 13, 1980 [JP] Japan .............................. 55-114598[U]
Aug. 14, 1980 [JP] Japan .............................. 55-115598[U]
Aug. 14, 1980 [JP] Japan .............................. 55-115599[U]

[51] Int. Cl.³ .................................................. F16F 9/34
[52] U.S. Cl. ..................................... 188/282; 137/809; 137/810; 137/814; 188/322.15; 188/320
[58] Field of Search ............... 188/282, 311, 320, 279, 188/281, 317, 316, 322.14, 322.15; 137/808–812, 814

[56] References Cited

U.S. PATENT DOCUMENTS

| 2,161,811 | 6/1939 | Grebe | 188/279 |
| 2,182,581 | 12/1939 | Casper | 188/282 |
| 2,637,414 | 5/1953 | Patriquin | 188/317 X |
| 3,220,517 | 11/1965 | Lorenz | . |
| 3,672,474 | 6/1972 | Mayer et al. | . |
| 3,804,216 | 4/1974 | Katsumori et al. | 188/317 X |
| 4,335,644 | 6/1982 | Goes et al. | 188/282 X |

FOREIGN PATENT DOCUMENTS

| 0045954 | 2/1982 | European Pat. Off. . |
| 697799 | 9/1940 | Fed. Rep. of Germany . |
| 2833776 | 1/1980 | Fed. Rep. of Germany . |
| 845638 | 8/1939 | France . |
| 1242350 | 8/1960 | France ............................ 188/320 |
| 600386 | 4/1948 | United Kingdom . |
| 1067196 | 5/1967 | United Kingdom . |
| 2044882 | 10/1980 | United Kingdom . |
| 2065268 | 6/1981 | United Kingdom . |

Primary Examiner—George E. A. Halvosa
Attorney, Agent, or Firm—Schwartz, Jeffery, Schwaab, Mack, Blumenthal & Koch

[57] ABSTRACT

A shock absorber has a piston which comprises upper and lower members. The upper and lower members are fixedly assembled to define therein the vortex chamber. The piston has vertically-extending channels on the periphery thereof to define the vertical section of the vortex passages together with the inner periphery of the cylinder tube.

9 Claims, 26 Drawing Figures

SHOCK ABSORBER

BACKGROUND OF THE INVENTION

The present invention relates generally to a hydraulic shock absorber for absorbing shock applied thereto and is applicable to a vehicle suspension, for example. More particularly, the invention relates to an improvement for a vortex shock absorber having a variable absorbing force which depends not only on the piston speed but also on the piston stroke, and to a simple construction for assemblying such a shock absorber.

Vortex shock absorbers have been well-known as applied to vehicle suspensions, for example. In such a shock absorber, a piston slidably received within a cylinder is provided with a vortex chamber therein. The piston defines upper and lower chambers within the cylinder. The vortex chamber is communicated with the upper and lower chambers via a vortex passage tangentially opening thereinto so that the fluid flow introduced therein generates a vortex for producing the absorbing force. Conventionally, the absorbing force produced by the shock absorber varies depending on the piston speed in response to the shock.

In case of the shock absorber applied to the suspension of an automotive vehicle, it is preferable to provide a relatively small absorbing force against a relatively small piston stroke, even though piston speed is relatively high, for riding comfort. On the other hand, for a relatively large piston stroke, a relatively large absorbing force is required for vehicle stability. Therefore, a shock absorber for use with an automotive vehicle suspension is required to vary the absorbing force against shock depending not only on piston speed but also on piston stroke.

In general, the piston stroke corresponding to various vehicle driving conditions are approximated as follows:

| | |
|---|---|
| abrupt turning | 40 mm |
| rapid acceleration | 50 mm |
| lane change | 35 mm |
| crossing bump | 3 mm |
| smooth road | 2 mm |
| rough road | 14 mm |

As explained above, when the vehicle is turned abruptly, rapidly accelerated, or changes lanes, a significant absorbing force is required for adequate driving stability. On the other hand, when the vehicle is driven over a slight bump, on a smooth road, or on a relatively rough road, a significant absorbing force is not required since the vehicle is easily maintained in a stable condition. In the latter driving condition, it is important to provide minimal absorbing force for riding comfort.

Meanwhile, for communication between the upper and lower fluid chambers, defined opposite the upper and lower sides of the piston, and the vortex chamber, the piston is formed with one or more vortex passages. Generally, the vortex passage comprises vertical and horizontal sections formed in the periphery of the piston. To provide for the vortex passages, the periphery of the piston must be sufficiently thick. This places a lower limit on the volume of the piston and in turn on the volume of the shock absorber.

Furthermore, in the conventional shock absorber, since the vertical and horizontal sections of the vortex passages are formed integrally in the periphery of the piston, the vortex passages make machining of the piston more difficult.

SUMMARY OF THE INVENTION

Therefore, it is an principle object of the present invention to provide a shock absorber designed for easy manufacturing and in which the thickness of the periphery of the piston is reduced.

Another object of the invention is to provide a shock absorber varying the absorbing force depending not only on the piston speed but also on the piston stroke.

To accomplish the above-mentioned and other objects, there is provided a shock absorber, according to the present invention, having a piston which comprises upper and lower members. The upper and lower members are fixedly assembled to define therein the vortex chamber. The piston has vertically-extending channels on the outer periphery thereof to define the vertical section of the vortex passage in conjunction with the inner periphery of the cylinder tube.

To accomplish the above-mentioned and other objects, there is provided, according to the present invention, a hydraulic shock absorber comprising a hollow cylinder defining therein a fluid chamber filled with a working fluid, a piston slidably disposed within the fluid chamber to divide the fluid chamber into upper and lower chambers and having first and second members assembled together for defining therein a vortex chamber, the upper and lower members being formed with a vertically-extending recess on the outer periphery thereof. The recesses formed in the upper and lower members are aligned with respect to each other and define vertical fluid passages. The piston further defines vortex passages, having inner ends tangentially opening toward the vortex chamber and outer ends opening toward the vertical passages, and a means for establishing communication between the upper and lower chambers and the vortex chamber.

BRIEF DESCRIPTION OF THE DRAWINGS

The present invention will be more fully understood from the detailed description given herebelow and from the accompanying drawings of the embodiments of the present invention, which, however, should not be understood as limitative to the invention but are for elucidation and explanation only.

In the drawings.

DESCRIPTION OF THE PREFERRED EMBODIMENT

Figure 1:
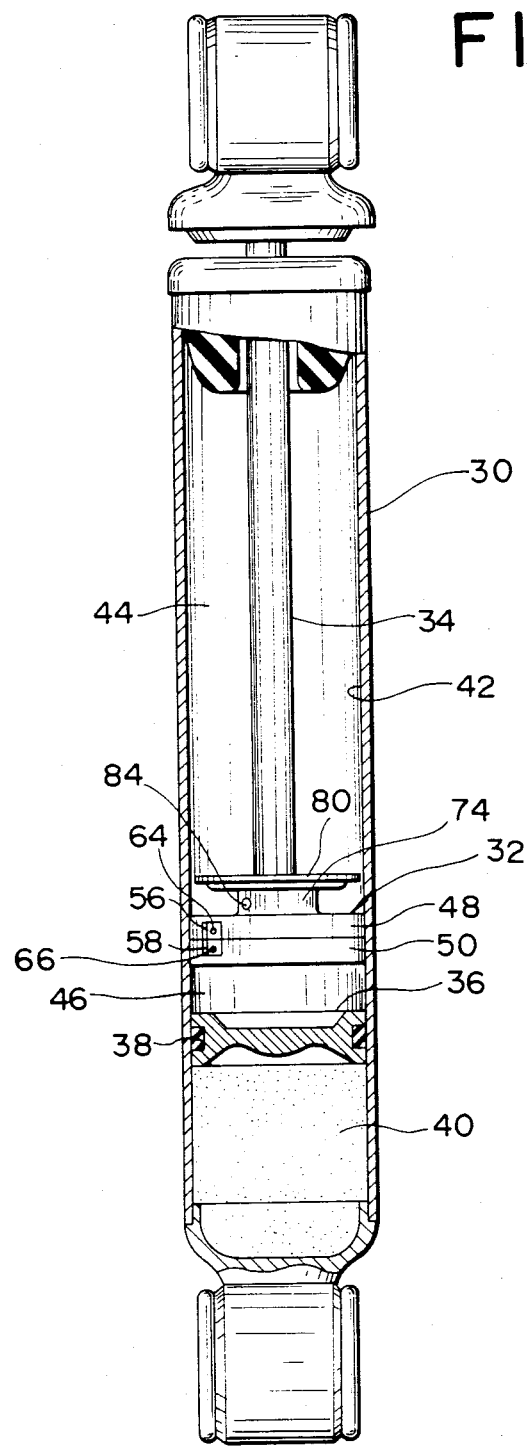
FIG. 1 is a longitudinal cut-away view of a first embodiment of a hydraulic shock absorber in accordance with the present invention.

Referring now to the drawings, particularly to FIGS. 1 to 4, there is illustrated a first embodiment of a shock absorber according to the present invention. The shock absorber comprises a hollow cylinder 30 and a piston 32 movably disposed within the cylinder 30. The piston 32 is secured on the lower end of a piston rod 34 which has an upper end extending out of the cylinder 30 and attached to a vehicle body chassis (not shown). On the other hand, the lower end of the cylinder 30 is attached to a wheel axle (not shown). A free piston 36 with an annular sealing ring 38 is also movably disposed within the tube to define within the cylinder 30 a pneumatic chamber 40. A chamber 42 defined within the cylinder tube 30 and being filled with a working fluid is divided into upper and lower chambers 44 and 46 respectively by the piston 32.

Figure 2:
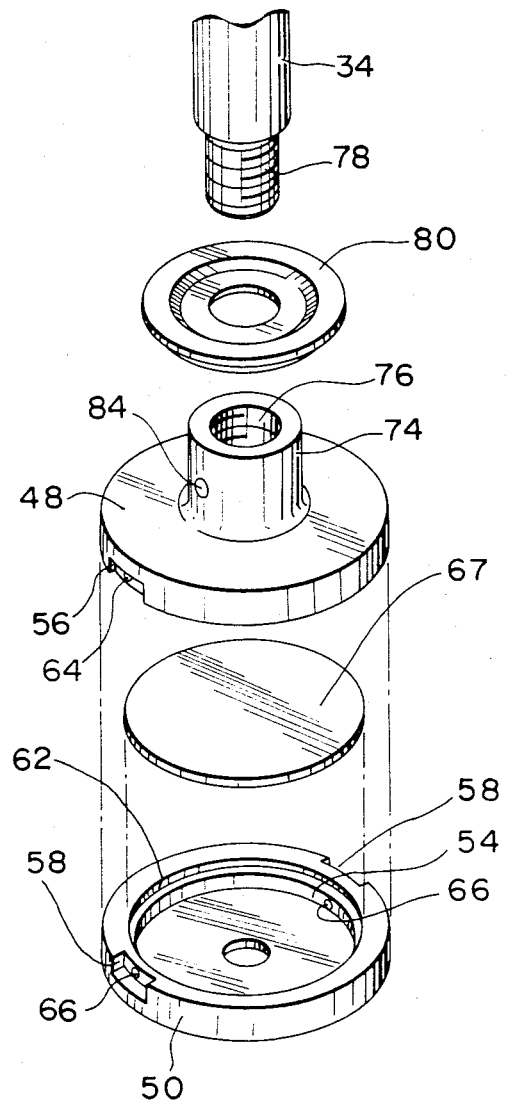
FIg. 2 is an enlarged and exploded perspective view of a piston included in the shock absorber of FIG. 1.
Figure 3:
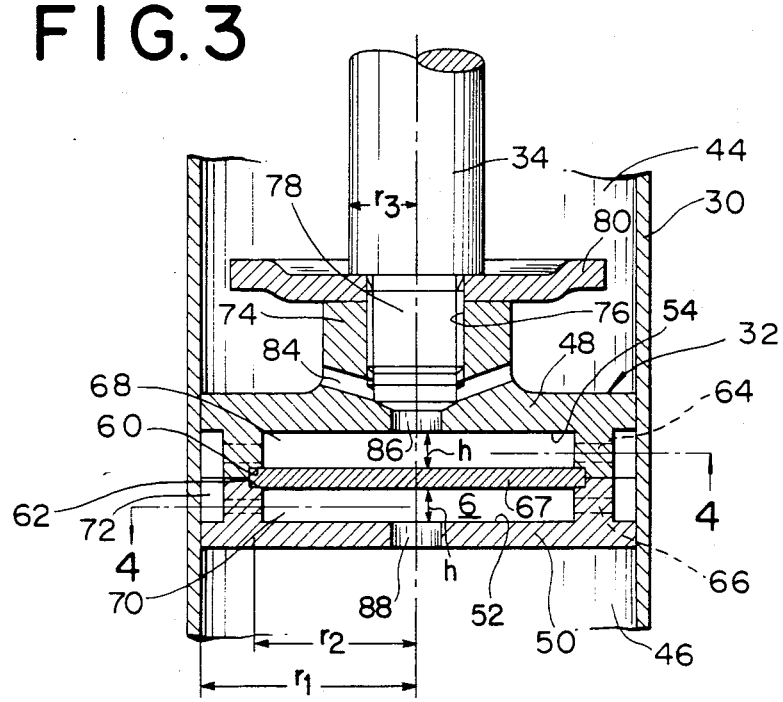
FIG. 3 is an enlarged cross-section of the piston of FIG. 2 in assembled position.
Figure 4:
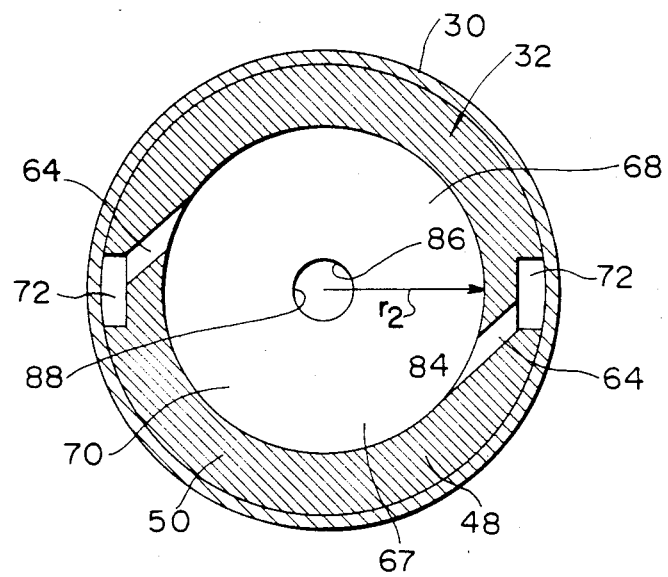
FIG. 4 is transverse cross-section of the piston of FIG. 2 taken along line 4—4 of FIG. 3.

As shown in FIGS. 2 to 4, the piston 32 comprises upper and lower predominately disc-shaped members 48 and 50 respectively formed with horizontally-oriented circular recesses 52 and 54 respectively. The upper and lower members are formed with recesses 56 and 58 respectively on the circumferences thereof. Vortex passages 64 and 66 are defined in the piston 32 such that the outer ends of the vortex passages 64 and 66 open toward the recesses 56 and 58 respectively and the inner ends thereof open toward the recesses 52 and 54 respectively. The inner ends of the vortex passages 64 and 66 are directed along the circumference of the recesses 52 and 54 respectively. A disc-shaped plate 67 is interposed between the upper and lower members 48 and 50. The plate 67 has a diameter substantially equal to that of the recesses 52 and 54.

Upon assembly, the planes having the recesses 52 and 54 face each other. The plate 67 is mounted within the recesses 52 and 54. In this position, the upper and lower members 48 and 50 are secured one another. For securing the upper and lower members 48 and 50, it is possible to use any suitable process to detachably or fixedly couple them.

Thus, the assembled piston 32 defines upper and lower vortex chambers 68 and 70, respectively, therein. Also, the piston 32 has vertical vortex passages 72 on its circumference, which are defined by the internal periphery of the cylinder 30 and the recesses 56 and 58. The vertical vortex passages 72 establish communication between the vortex passages 64 and 66.

The upper member 48 of the piston 32 is provided with a projecting portion 74 with a threaded bore 76 on the surface facing the piston rod 34. The piston rod 34 has a threaded portion 78 at the lower end thereof. The threaded portion 78 engages with the threaded bore 76 for attaching the piston 32 onto the lower end of the piston rod 34. A dish-shaped member 80 is mounted on the top of the projecting portion 74 and secured thereto by engagement of the threaded portion 78 and the threaded bore 76. A pair of radial passages 84 extend radially through the projecting portion 74. The outer ends of the passages 84 open into the upper fluid chamber 44 at the circumference of the projecting portion 74 and the inner ends thereof open toward the threaded bore 76. The threaded bore 76, in turn, communicates with the upper vortex chamber 68 via an opening 86. On the other hand, the lower member 50 of the piston 32 is formed with an opening 88 in its central portion for communication between the lower vortex chamber 70 and the lower fluid chamber 46.

It should be noted that the vortex passages 64 and 66, and the fluid passages 84 have diameters small enough to limit the fluid flow therethrough and, therefore, are adapted to serve as orifices.

Preferably, with respect to the dimensional relationship of the piston 32, the effective area So(given in mm$^2$), which serves to vary the relative volumes of the upper and lower chambers 44 and 46, and the horizontal cross-sectional area Sv(given in mm$^2$) of the upper and lower vortex chambers 68 and 70 can be obtained from the following equations respectively:

$$So = r_1^2 \cdot \pi - r_3^2 \cdot \pi$$

$$Sv = r_2^2 \cdot \pi$$

In the preferred embodiment, the dimensions of piston 32 are such that the relationship between the effective area So and the horizontal cross-sectional area Sv of the vortex chambers 68 and 70 can be represented by:

$$1 \text{ (mm)} \leq \frac{h \cdot Sv}{So} \leq 6 \text{ (mm)},$$

where h is the height in mm of each of the vortex chambers 68 and 70.

It should be noted that the above-specified dimensional relationship can be applied to any hydraulic shock absorber absorbing shock by generating a vortex. Therefore, the specific construction of the shock absorber gives no limitation to the present invention in any way. Furthermore, it should be noted that the present invention is designed in accordance with the dimensional relationship of the areas serving to vary the volume of the chambers 44 and 46 and serving to generate a vortex in the vortex chambers 68 and 70.

In the compression stroke, the volume of the lower fluid chamber 46 is reduced corresponding to the downward movement of the piston 32 to increase the fluid pressure therein. The downward movement of the piston 32, in turn, decreases the fluid pressure in the upper fluid chamber 44 due to expansion of the volume of that chamber. Due to the pressure difference between the upper and lower fluid chamber, the fluid in the lower fluid chamber flows into the lower vortex chamber 70 via the opening 88.

As a result, the fluid in the lower chamber 46 flows into the upper chamber 44 via the piston 32. The fluid in the chamber 46 enters the lower vortex chamber through the opening 88. The fluid flows via the lower vortex chamber 70, the vortex passage 66, the vertical vortex passage 72 and the vortex passage 64 into the upper vortex chamber 68. From the vortex passage 64, the fluid is discharged into the upper chamber 68 along a tangent to the circle of the upper vortex chamber 68 in order to produce a vortex therein. Thereafter, the fluid flows into the upper chamber 44 via the opening 86 and the passages 84. At this time, the fluid passages 84 serve as orifices to limit the flow therethrough. Also the vortex passages 64 and 66 limit the flow of the fluid therethrough to produce resistance against the fluid flow.

If the piston stroke is relatively small, the resistance against the fluid flow produced by the vortex in the upper vortex chamber 68 is insufficient to absorb the shock. Against the fluid flow, the fluid passages 84 and the vortex passages 64 and 66 serve to provide resistance against the fluid flow at this time. As the the piston stroke increases, the absorbing force against the shock which, in turn, corresponds to the resistance against the fluid flow, is mainly produced by the orifice effect provided by the fluid passage 84 and the vortex passages 64 and 66. When the piston stroke exceeds a predetermined value, the resistance against the fluid flow provided by the vortex in the upper vortex chamber 68 becomes sufficient to absorb the shock. The threshold where the piston stroke becomes great enough to absorb the shock is determined by the dimensional relationship between the effective cross-sectional area of the piston and the cross-sectional area of the vortex chamber.

In the preferred construction of the piston according to the present invention, the threshold is set in a range of approximately 5 mm to 30 mm of piston stroke, in consideration of the various vehicle driving conditions.

Likewise, in the expansion stroke of the piston 32, the volume of the upper chamber 44 is reduced and the volume of the lower chamber 46 is increased to induce fluid flow via the piston 32. During the fluid flow through the vortex chambers 68 and 70, the vortex is produced in the lower vortex chamber 70 in order to generate the shock absorbing force.

Figure 5:
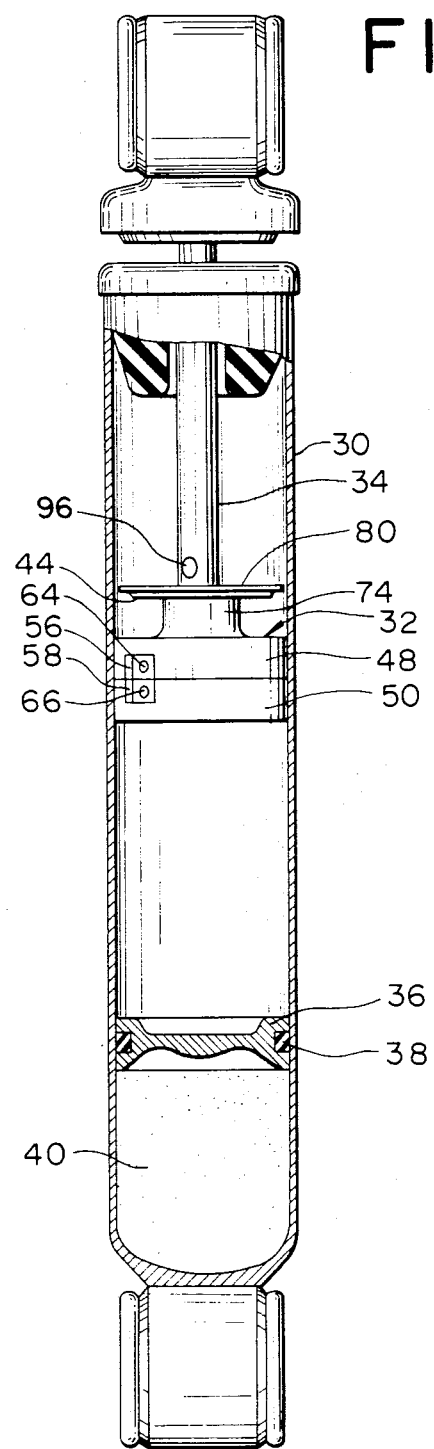
FIG. 5 is a longitudinal cut-away view of a modification of the shock absorber of FIG. 1.
Figure 6:
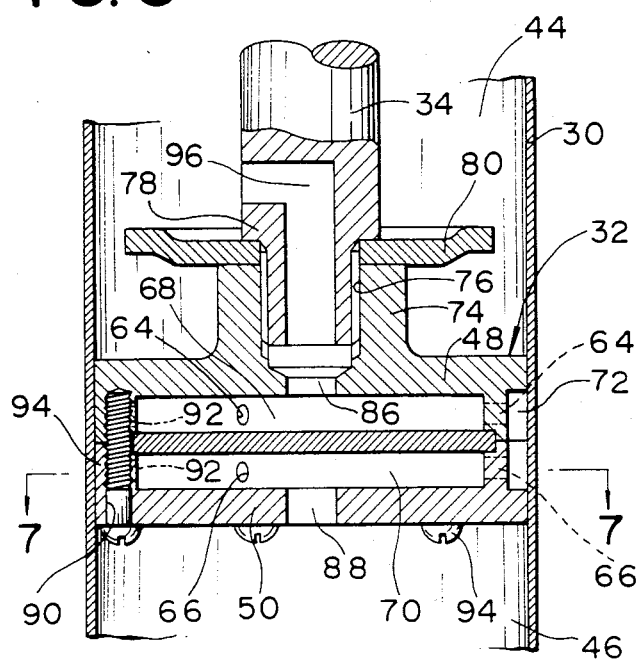
FIG. 6 is an enlarged cross-section of the piston included in the shock absorber of FIG. 5 taken along line 6—6 of FIG. 7.
Figure 7:
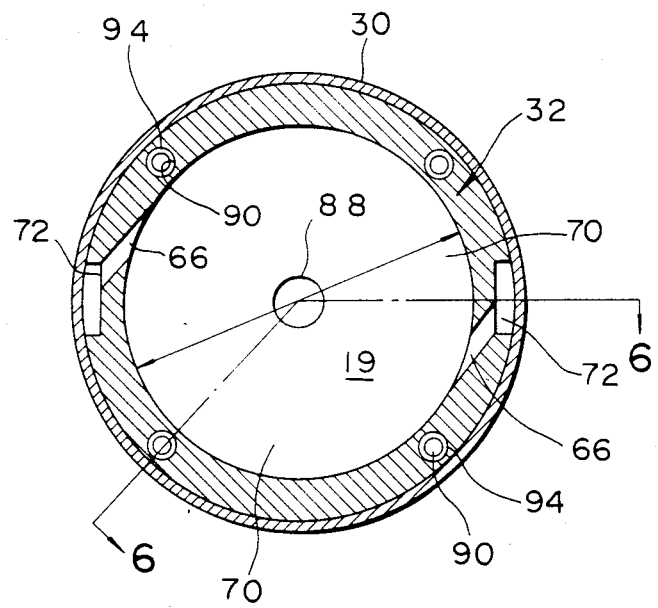
FIG. 7 is an enlarged transverse cross-section of the piston of FIG. 6 taken along line 7—7 of FIG. 6.

FIGS. 5 to 7 show a modification of the foregoing first embodiment of the invention. Since the most parts of this modification are substantially same as that of the foregoing, the reference numerals given to the corresponding parts which have the same construction and the same function are the same as in the preceeding embodiment to avoid repetition of the description. Therefore, the parts not illustrated herebelow should be understood as being the same as in the preceding description.

Similarly, to the foregoing first embodiment, the piston 32 of the present modification comprises upper and lower members 48 and 50 and defines therein upper and lower vortex chambers 68 and 70. The lower member 50 is formed with a plurality of apertures 90 extending in parallel with the axis of the piston 32. The upper member is also formed with a plurality of threaded bores 92 extending in parallel with the axis of the piston. The apertures 90 and the threaded bores 92 are located to align with one another upon assembly of the piston. A plurality of screws 94 extend through apertures 90 and engage with threaded bores 92 for securing the upper and lower members 48 and 50 of the piston in the assembled position.

The projecting portion 74 has the threaded bore 76. The threaded bore 76 receives the threaded portion 78 of the piston rod 34 for attaching the piston onto the lower end of the piston rod 34. The threaded portion 78 is formed with an angled duct 96. The vertical section of the angled duct 96 extends along the longitudinal axis of the piston rod 34 and opens toward the lower end thereof. The lateral section of the angled duct 96 extends radially to open at the periphery of the piston rod. The vertical section of the angled duct 96 is aligned with the opening 88.

Thus, in this modification, the upper fluid chamber 44 and the upper vortex chamber 68 communicate via the angled duct 96 and the opening 86.

Figure 8:
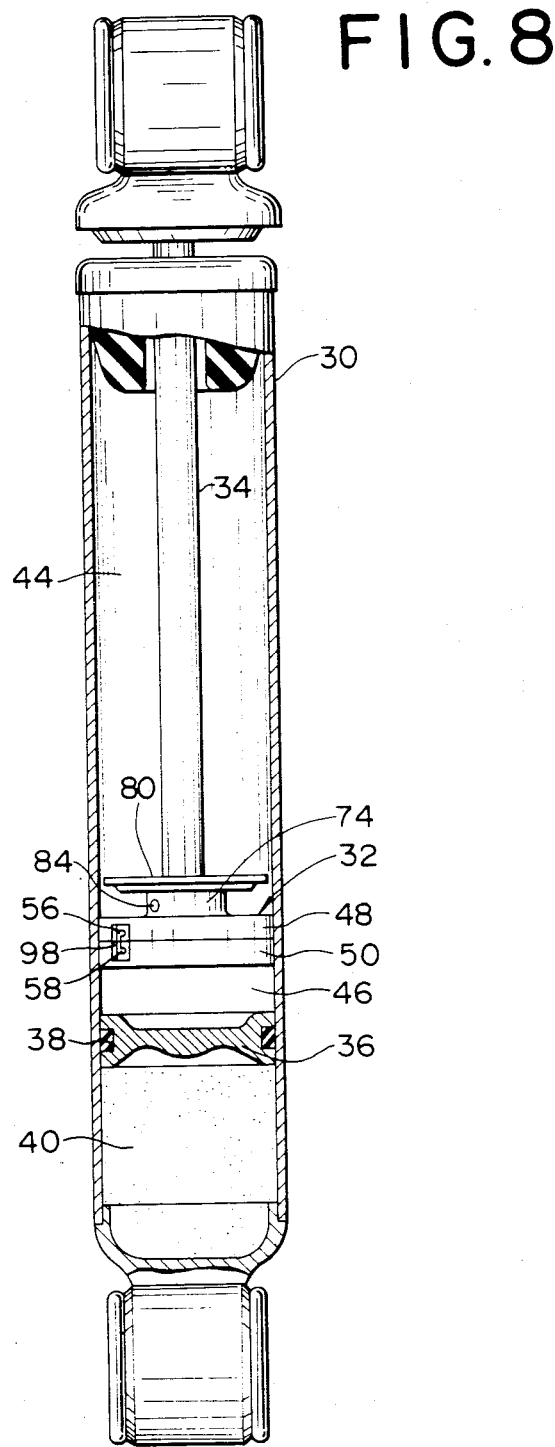
FIG. 8 is a longitudinal cut-away view of a further modification of the shock absorber of FIG. 1.
Figure 9:
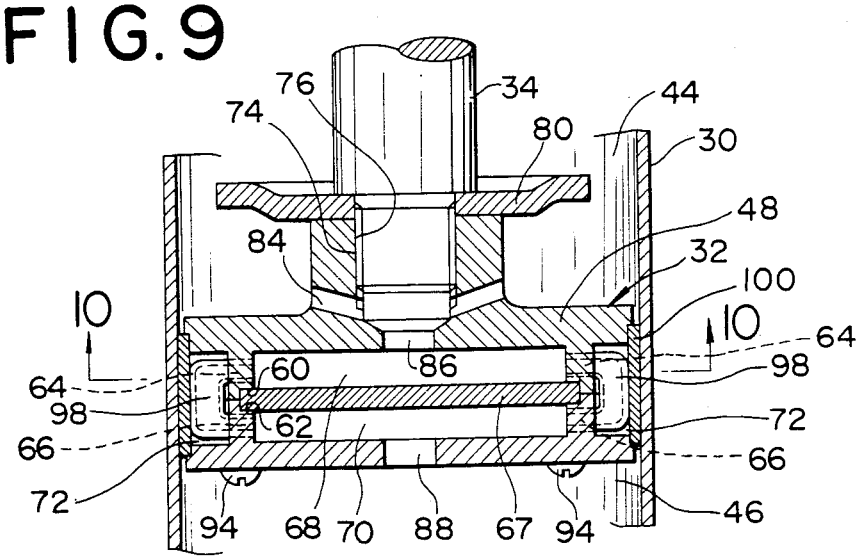
FIG. 9 is an enlarged cross-section of the piston included in the shock absorber of FIG. 8.
Figure 10:
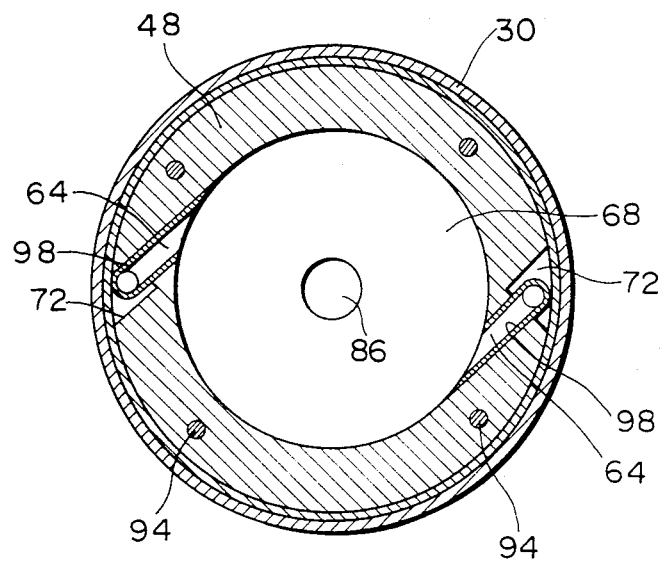
FIG. 10 is an enlarged transverse cross-section of the piston of FIG. 9 taken along line 10—10 of FIG. 9.
Figure 11:
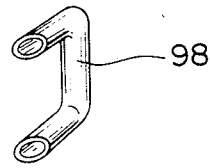
FIG. 11 is a further enlarged perspective view of a vortex passage for communication between upper and lower vortex chambers formed in the piston of FIG. 9.

FIGS. 8 to 10 show a further modification of the shock absorber of FIG. 1. In the following description, the common parts which are not modified are represented by common reference numerals.

In this modification, a tube 98 is inserted into the vortex passages 64, 66 and 72. The tube 98 is angled near both ends thereof to define vertical and lateral sections. The vertical section of the tube 98 is disposed within the vertical vortex passage 72 and the horizontal sections extend through the vortex passages 64 and 66. The vertical vortex passage 72 is defined by the vertically extending recesses on the circumference of the piston 32 and a cylindrical sleeve 100 mounted on the circumference.

According to this modification, the vortex chambers 68 and 70 are connected via the tube 98 arranged along the vortex passages 64, 66 and 72. The tube 98 serves to conduct the fluid smoothly between the upper and lower vortex chambers 68 and 70.

Figure 12:
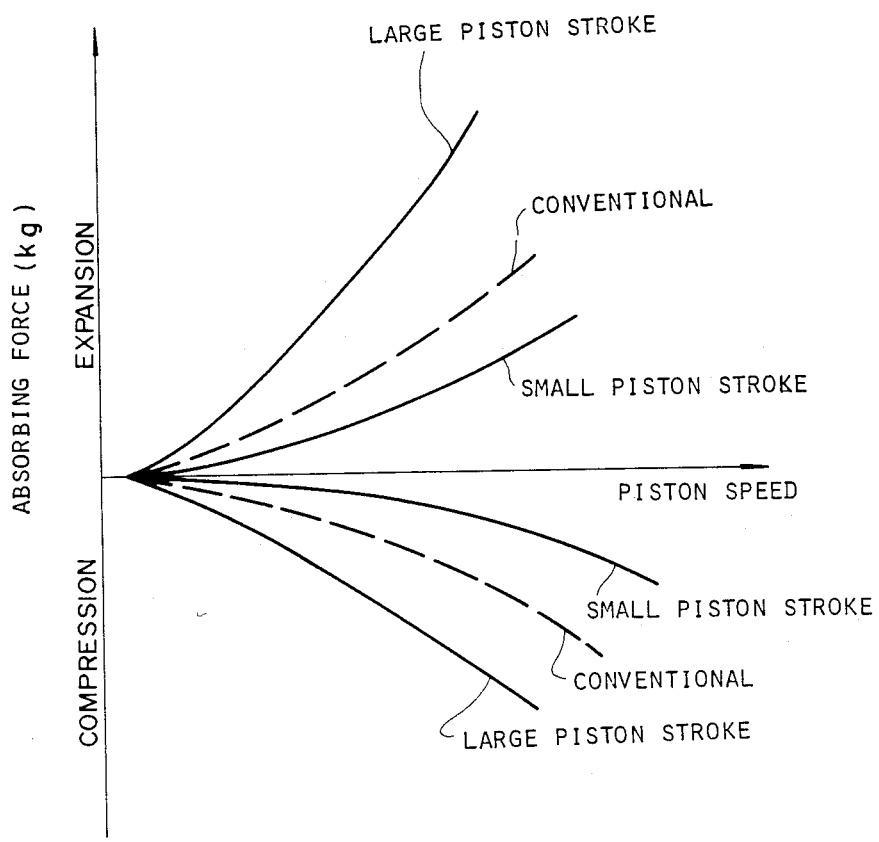
FIG. 12 is a graph showing variation of absorbing force with respect to variation of the speed of the piston, wherein the variation of the absorbing force in the shock absorber of FIG. 8 is represented by solid lines and the variation of the absorbing force in the conventional one is represented by broken lines.

FIG. 12 is a graph showing the relationship between the absorbing force and the piston speed of the above-described modifications of FIGS. 8 to 10, which can be compared with that produced by the conventional vortex shock absorber. As seen from FIG. 12, the absorbing force against shock causing a relatively small piston stroke can be smaller than that of a conventional shock absorber. This makes the vehicle suspension respond more gently to provide a more comfortable ride. On the other hand, in the case of a relatively great piston stroke, the absorbing force produced by the shock absorber can be increased to ensure greater stability for the vehicle.

Thus, according to this modification, the absorbing force is varied depending on not only the piston speed but also the piston stroke.

Figure 13:
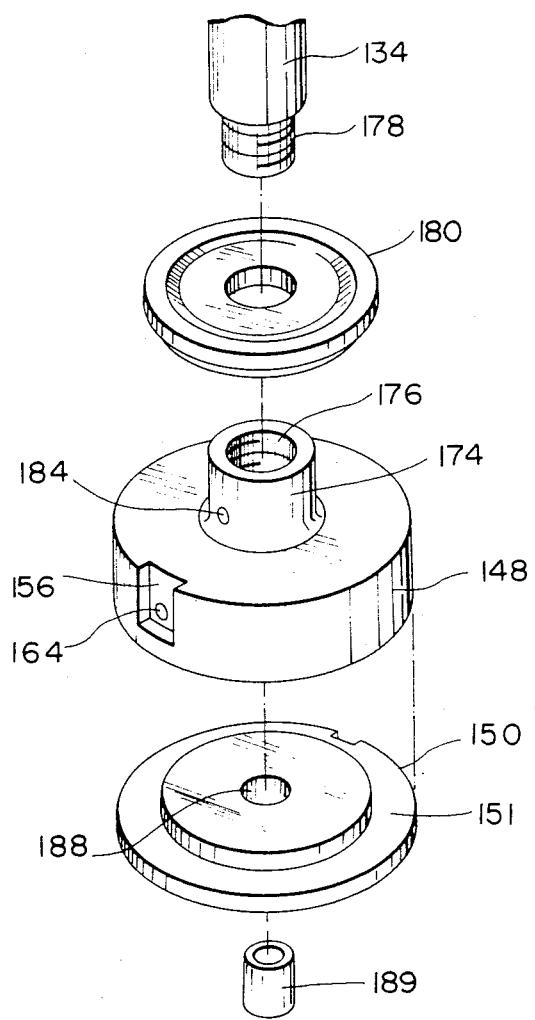
FIG. 13 is an exploded perspective view of the second embodiment of the piston of the shock absorber according to the present invention.
Figure 14:
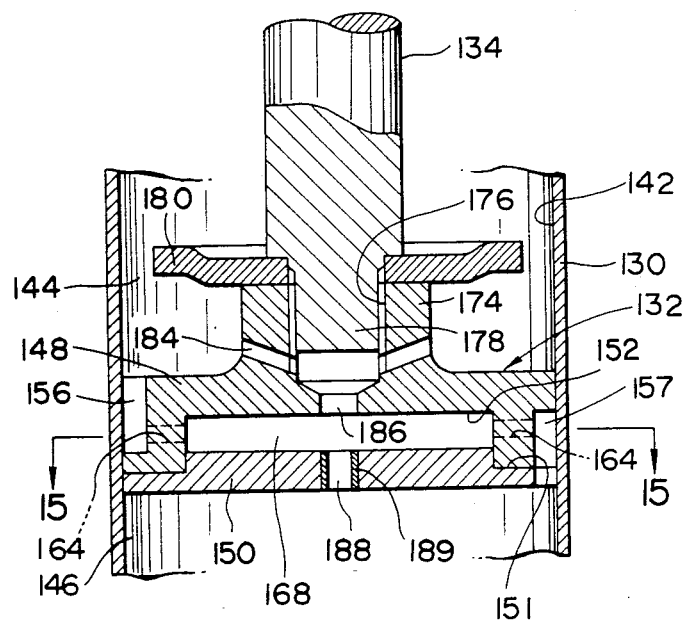
FIG. 14 is a longitudinal cross-section of the piston of FIG. 13.
Figure 15:
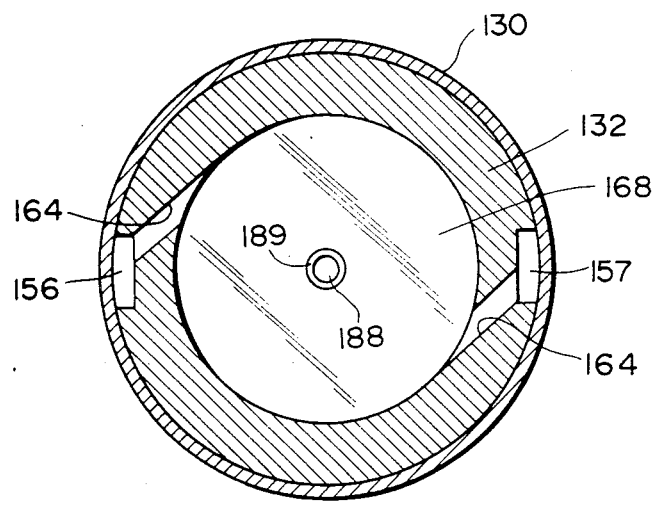
FIG. 15 is a transverse cross-section of the piston of FIG. 13 taken along line 15—15 of FIG. 14.

Referring now to FIGS. 13 to 15, there is illustrated the second embodiment of a shock absorber according to the present invention. Though the drawings show only the part of the shock absorber including the piston, it should be understood that the construction of the shock absorber not illustrated herein is the same as shown in FIG. 1. A piston 132 is movably disposed within a chamber 142 defined in a cylinder 130. The piston 132 divides the chamber 142 into upper and lower fluid chambers 144 and 146.

As shown in FIGS. 13 and 14, the piston comprises an upper member 148 and a lower member 150 engageable with one another. The upper member 148 is formed with a circular recess 152 in the lower surface thereof. The upper member 148 is formed with a pair of vertically-extending recesses 156 and 157 on its periphery. In the shown embodiment, the recesses 156 and 157 are located in alignment on the diametric line of the upper member 148. The recess 156 opens into upper fluid chamber 144 at the upper end thereof and the recess 157 opens into the lower fluid chamber 146 at the lower end thereof. The recesses 156 and 157 communicate with the recess 152 via vortex passages 164. The vortex passages 164 extend through the upper member 148 and open to the recess 152 at the inner ends and to the recesses 156 or 157 at the outer ends. The inner ends of the vortex passages 164 are aligned tangentially to the circle of the recess 152.

The upper member 148 is further provided with a cylindrical projecting portion 174 with a threaded bore 176 on the upper surface thereof. The threaded bore 176 receives a threaded end portion 178 of a piston rod 134 for attaching the piston 132 on to the lower end of the piston rod 134. A dish shaped member 180 is mounted on the top of the projecting portion 174 and secured thereon by engagement of the threaded bore 176 and the threaded end portion 178. A plurality of narrow passages 184 extend radially through the projecting portion 174 to open toward the threaded bore 176 at the inner ends thereof and into the upper fluid chamber 144 at their outer ends. The threaded bore 176 communicates with the recess 152 via a vertical passage 186.

The lower member 150 is disc-shaped and formed with an annular cut-out 151 along the circumference of the upper plane surface. The cut-out 151 is engageable with the lower surface of the upper member 148, as shown in FIG. 14. On the other hand, the lower member 150 is also formed with a vertically-extending opening 188 through the central portion thereof. A cylindrical pipe 189 is disposed within the opening 188 for reducing the cross-sectional area of the latter.

The upper and lower members 148 and 150 are assembled together to constitute the piston 132. Upon assembly, the lower member 150 is secured onto the lower surface of the upper member 148 by any suitable means, such as with screws. In the assembled condition, the recess 152 is closed by the lower member 150 to define the vortex chamber 168.

In the expansion stroke of the shock absorber, the piston 132 moves upwards to reduce the volume of the upper fluid chamber 144 and thereby to increase the fluid pressure in the upper fluid chamber 144. On the other hand, due to the piston motion, the volume of the lower fluid chamber 146 is increased to reduce the fluid pressure in the lower chamber 146. Due to the fluid pressure difference between the upper and lower fluid chamber 144 and 146, the fluid in the upper chamber 144 flows to the lower chamber 146 via the vortex chamber 168 to equalize the fluid pressure. At this case, the fluid in the upper fluid chamber 144 flows into the vortex chamber 168 through the fluid passages 184 and 186, and through the recess 156 and the vortex passage 164. Here, since the fluid passage 184 has relatively small cross-sectional area, the fluid flow therethrough is limited. On the other hand, the fluid flowing into the vortex chamber 168 via the vortex passage 156 is discharged toward the circumference of the vortex chamber to produce the vortex therein. The vortex in the vortex chamber 168 also limits the flow of the fluid therethrough. If the piston stroke is relatively small, the resistance against the fluid flow provided by the vortex is insufficient to provide rigidity for the shock absorber. Therefore, against a shock causing a relatively small piston stroke, resistance against the fluid flow in the fluid passages 184 provides most of the absorbing force. Furthermore, the area of the opening 188 reduced by the pipe 189 will serve as an orifice to produce resistance against the fluid flow. As the piston stroke increases, resistance due to the vortex becomes a major part of the absorbing force provided by the shock absorber.

Figure 16:
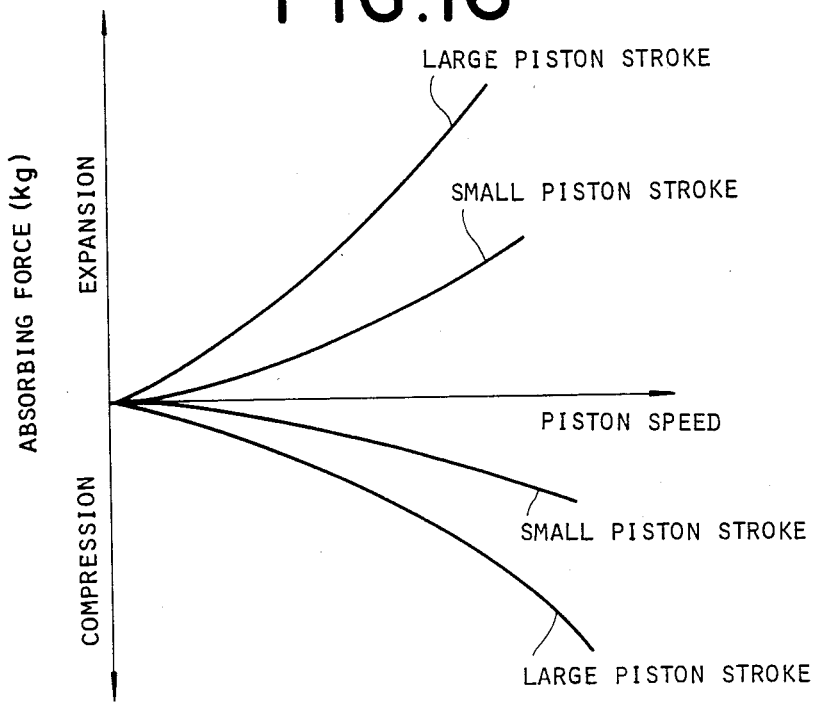
FIG. 16 is a graph showing variation of the absorbing force of the shock absorber of FIG. 13 with respect to variation of the speed of the piston.

FIG. 16 shows variation of the absorbing force with respect to the piston speed. As shown in FIG. 16, the absorbing force produced in response to relatively short piston stroke depends mainly on the resistance provided by the orifice effect of the passage 184 and the opening 188. Therefore, the absorbing force against a shock resulting in a relatively small piston stroke can be sufficiently reduced for riding comfort. On the other hand, if the shock causes relatively great piston stroke, the resistance of the vortex against the fluid flow is sufficiently increased to produce greater absorbing force.

Figure 17:
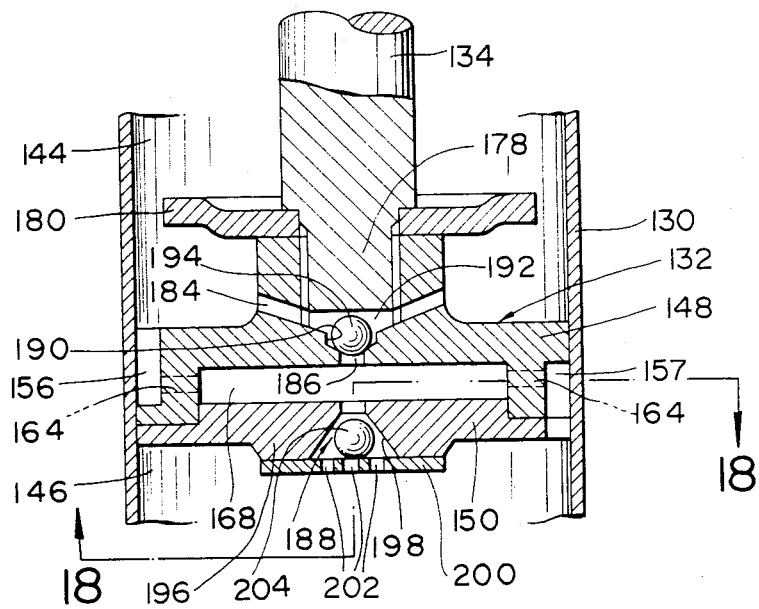
FIG. 17 is a longitudinal cross-section of a modification of the shock absorber of FIG. 13.
Figure 18:
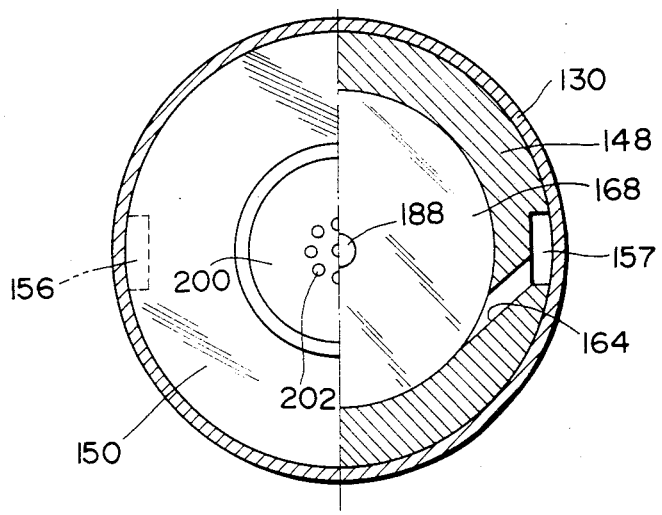
FIG. 18 is a transverse cross-section of the cylinder of FIG. 18 taken along line 18—18 of FIG. 17.

FIGS. 17 and 18 show a modification of the foregoing second embodiment of the present invention. In the following description of this modification, the parts constructed similar to that of the foregoing and having the same function will be represented by the same reference numerals. Although some of the features are not illustrated in the description hereinafter, they should be understood as being the same as those of the foregoing modifications.

As shown in FIG. 17, the piston 132 comprises upper and lower members 148 and 150. The upper member 148 has a projecting portion 174 on its upper surface. The projecting portion 174 is formed with an axially-extending threaded bore 176 with a stepped lower section 190. The lower section 190 is in communication with the vertical fluid passage 186. The threaded portion 178 of the piston rod 134 engages with the threaded bore 176 for attaching the piston 132 onto the lower end of the piston rod 134. In this assembled position, the threaded portion 178 of the piston rod 134 and the threaded bore 176 define a fluid flow space 192 with the stepped section 190 of the threaded bore. A ball-shaped valve member 194 is disposed within the space 192. The stepped section 190 of the threaded bore 176 serves as the valve seat of the valve member 194.

The lower member 150 is provided with a projecting portion 196 on the lower surface thereof. The opening 188 extends through the major portion and the projecting portion 196 of the lower member 150. The opening 188 has an enlarged conical lower section 198. A retainer plate 200 with a plurality of vertically extending apertures 202 is attached onto the lower end of the projecting portion 196. The retainer plate 200 thus closes the lower end of the through opening 188 but maintains communication between the opening 188 and the lower fluid chamber 146 via the apertures 202. A ball-shaped valve member 204 is disposed within the conical lower section 198 of the opening 188. For the valve member 204, the upper end of the conical lower section 198 serves as the valve seat.

In the expansion stroke, the fluid flow produced by the upward piston motion and flowing through the radial fluid passages 184 urges the valve member 194 onto the valve seat 190. If the piston stroke is relatively small, thus producing relatively little flow, the valve member 194 still permits limited flow between the upper fluid chamber 144 and the vortex chamber 168. In this case, since the flow into the vortex chanber 168 via the vortex passages 164 is too small to generate the vortex, the resistance against the fluid flow provided by the radial fluid passage 184 and the narrowed space between the valve member 194 and the valve seat 190 serve to absorb the shock.

On the other hand, if the piston stroke in response to application of the shock is relatively great, the valve member 194 is urged onto the valve seat 190 to block communication between the upper fluid chamber 144 and the vortex chamber 168, and the fluid in the upper fluid chamber 144 flows into the vortex chamber 168 only via the vortex passages 164. In this case, the vortex generated in the vortex chamber 168 creates greater resistance against the fluid flow. Since the vortex provides greater resistance than that provided by the fluid passage 184, the absorbing force against this shock becomes considerably greater than that against the shock causing a relatively small piston stroke.

On the other hand, in the compression stroke of the piston, the fluid flow created by the downward piston motion and flowing through the opening 188 urges the valve member 204 toward the upper end of the conical lower section 198. If the piston stroke is relatively small, the flow is small. The valve member 204 still permits flow between the lower fluid chamber 146 and the vortex chamber 168. At this time, since the flow into the vortex chamber 168 via the vortex passage 164 is too small to generate the vortex, the resistance against the fluid flow provided by the space between the valve member 204 and the upper end of the lower section 198 provides most of the shock abosrbing force.

On the other hand, if the piston stroke in response to application of the shock is relatively great, the valve member 204 is seated onto the upper end of the lower section 198 to block communication between the lower fluid chamber 146 and the vortex chamber 168, the fluid in the lower fluid chamber 146 flows into the vortex chamber 170 only via the vortex passage 164. In this case, the vortex is generated in the vortex chamber 168 to create resistance against the fluid flow. Since the vortex provides greater resistance than that provided by the orifice effect of the space between the valve member 204 and the upper end of the lower section 198, the absorbing force against this shock becomes considerably greater than that against the shock causing a relatively small piston stroke.

Figure 19:
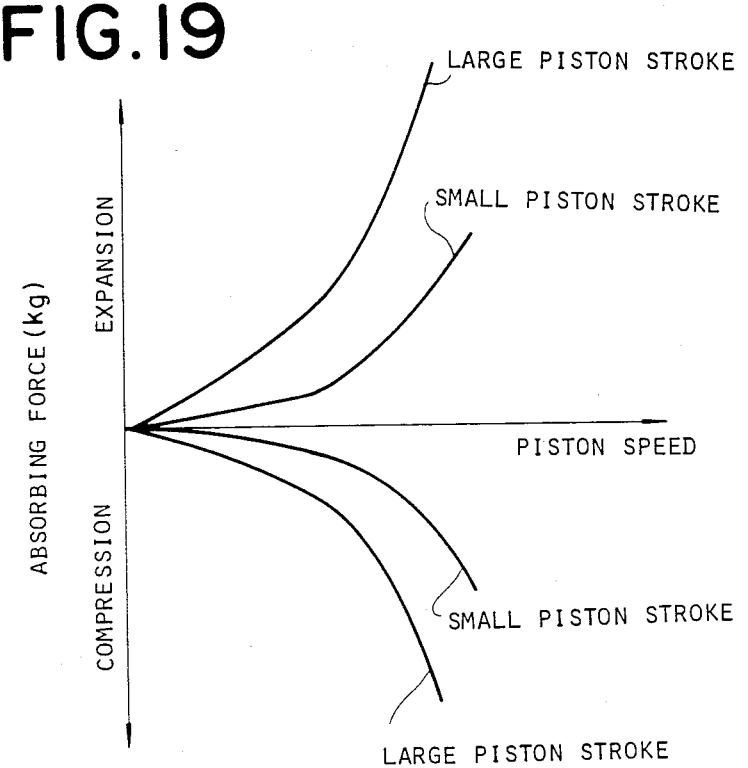
FIG. 19 is a graph showing the relationship between the absorbing force produced by the shock absorber of FIG. 17 and the speed of the piston.

FIG. 19 shows the variation of the absorbing force with respect to the piston speed. As apparent from FIG. 19, the absorbing force produced by the shock absorber of FIGS. 17 and 18 depends on not only the piston speed but also the piston stroke.

Figure 20:
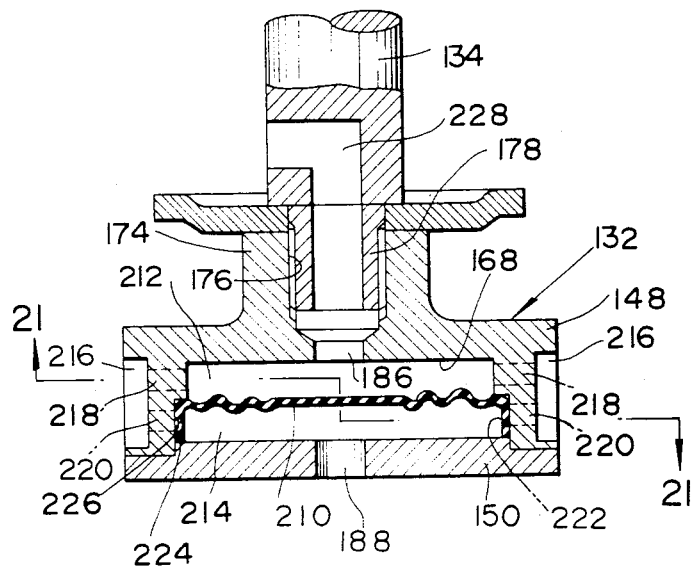
FIG. 20 is a longitudinal cross-section of a further modification of the shock absorber of FIG. 13.
Figure 21:
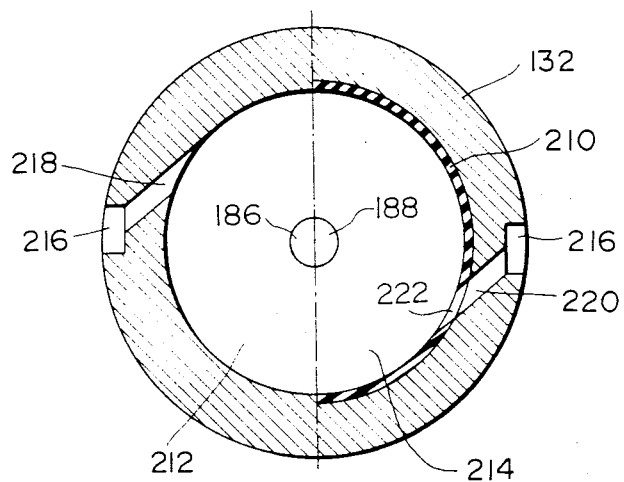
FIG. 21 is a transverse cross-section of the piston of FIG. 20 taken along line 21—21 of FIG. 20.

FIGS. 20 and 21 show another modification of the second embodiment of the present invention. The upper and lower members of the piston 148 and 150 in assembled position define the vortex chamber 168 in the piston 132. An elastic partitioning member 210 is disposed within the vortex chamber 168 to divide the vortex chamber 168 into the upper and lower sections 212 and 214. A pair of vertically-extending recesses 216 is formed on the periphery of the upper member 148. The recesses 216 communicate with upper and lower sections 212 and 214 of the vortex chamber 168 via the vortex passages 218 and 220, respectively. As shown in FIG. 20, the partitioning member 210 is formed with tangentially-extending opening 222 on the vertical portion 224 thereof, which engages with an annular recess 226 formed on the inner circumferential periphery of the lower member 150.

The upper member 148 of the piston 132 is provided with the projecting portion 174 with a threaded bore 176. The threaded bore 176 communicates with the upper section 212 of the vortex chamber 168 via the vertical fluid passage 186. In turn, the vertical fluid passage 186 communicates with the upper fluid chamber (not clearly shown) via an angled duct 228 having a vertical section extending through the threaded portion 178 of the piston rod 134 and a horizontal section opening into the upper fluid chamber 144 at the periphery of the piston rod 134.

In the shown embodiment, the elastic partitioning member 210 is formed of an elastic rubber. However, this can be formed of any suitable material such as synthetic resin, spring steel and so on.

In operation, according to the fluid flow from the upper fluid chamber 144 to the lower fluid chamber 146 or from the lower fluid chamber 146 to the upper fluid chamber 144 via the vortex chamber 168, the partitioning member 210 is deformed due to the fluid pressure applied thereto to absorb the pressure. The partitioning member 210 deforms to the elastical limit thereof and works as a rigid partition after deformation to the elastical limit. Therefore, if the piston stroke in response to the shock applied is small, the pressure of fluid flow is absorbed by the partitioning member 210. In this case, the vortex produces no absorbing force against the shock. If the piston stroke is great enough to deform the partitioning member to the rigid state, the shock is absorbed by the function of the vortex in substantially the same manner as illustrated in foregoing embodiment of FIGS. 5 to 7.

Figure 22:
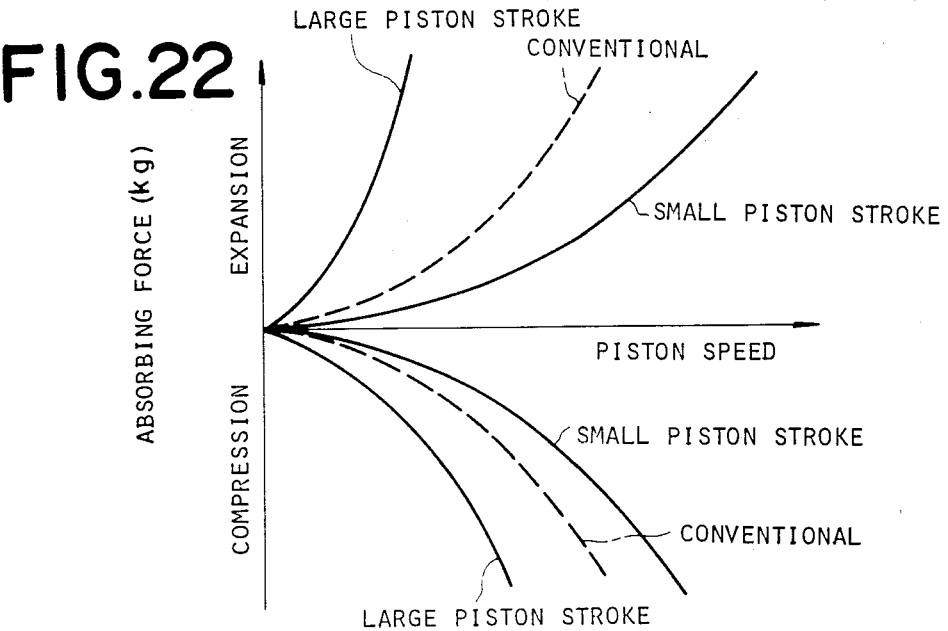
FIG. 22 is a graph showing the relationship between the absorbing force and piston speed of the shock absorber of FIG. 20.

FIG. 22 shows the variation of the absorbing force produced by the foregoing shock absorber of FIGS. 20 and 21 with respect to the piston speed. As seen from FIG. 22, the absorbing force depends on not only the piston speed but also the piston stroke.

Figure 23:
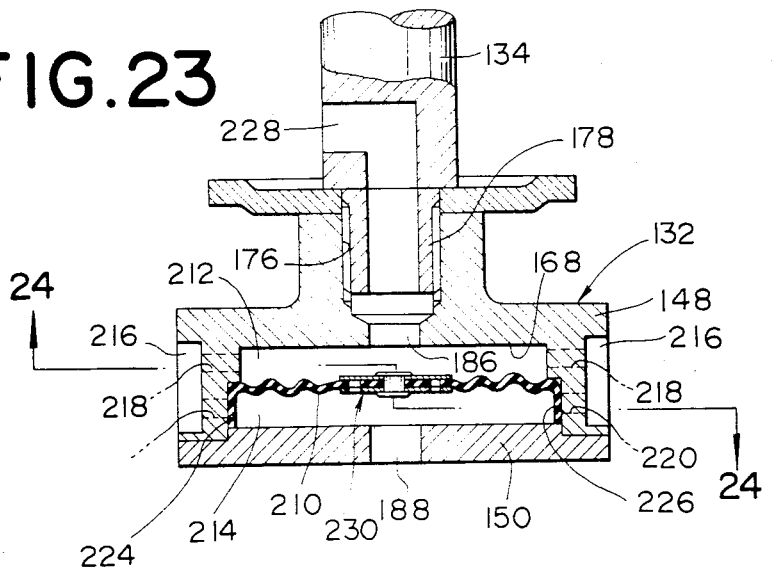
FIG. 23 is a longitudinal cross-section of a still further modification of the shock absorber of FIG. 13.
Figure 25:
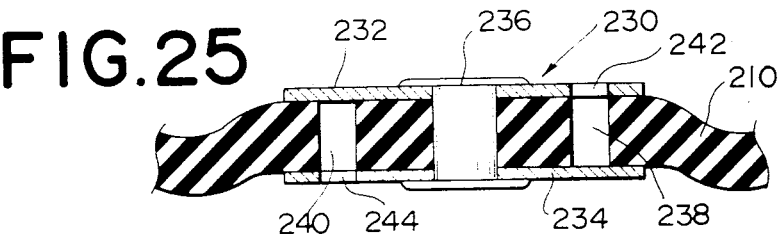
FIG. 25 is an enlarged partial cross-section showing detail of the relief valve employed in the shock absorber of FIG. 23.
Figure 24:
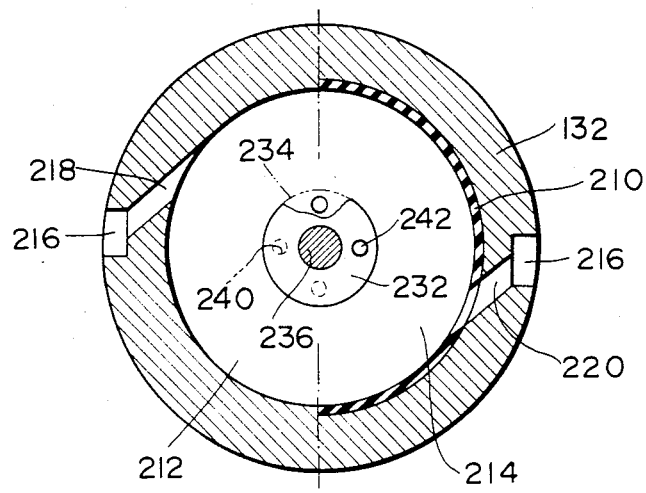
FIG. 24 is a transverse cross-section of the piston of FIG. 23 taken along line 24—24 of FIG. 23.

Referring to FIGS. 23 to 25, there is illustrated a further modification of the second embodiment of the invention. Similarly to the foregoing modification, the upper and lower members of the piston 148 and 150 in assembled position define the vortex chamber 168 in the piston 132. An elastic partitioning member 210 is disposed within the vortex chamber 168 to divide the vortex chamber 168 into the upper and lower sections 212 and 214. A pair of vertically-extending recesses 216 is formed on the periphery of the upper member 148. The recesses 216 communicate with upper and lower sections 212 and 214 of the vortex chamber 168 via the vortex passages 218 and 220, respectively. As shown in FIG. 20, the partitioning member 210 is formed with tangentially-extending opening 222 on the vertical portion 224 thereof, which engages with an annular recess 226 formed on the inner periphery of the lower member 150.

The upper member 148 of the piston 132 is provided with a projecting portion 174 with a threaded bore 176. The threaded bore 176 communicates with the upper section 212 of the vortex chamber 168 via the vertical fluid passage 186. In turn, the vertical fluid passage 186 communicates with the upper fluid chamber (not clearly shown) via an angled duct 228 having a vertical section extending through the threaded portion 178 of the piston rod 134 and a horizontal section opening into the upper fluid chamber 144 at the periphery of the piston rod 134.

The partitioning member 210 is provided with a relief valve 230. The relief valve 230 comprises a pair of disc-shaped elastic plates 232 and 234 made of elastic material such as spring steel. The plates 232 and 234 are attached onto both surfaces of the partitioning member 210 with a fastening member 236 such as a rivet, in the central portion thereof. The partitioning member 210 is formed with a plurality of apertures 238 and 240 which extend vertically. The plate 232 is formed with a plurality of openings 242 in axial alignment with the openings 238. Likewise, the plate 234 is formed with a plurality of openings 244 in alignment with the opening 240. The plates 232 and 234 define a set pressure for the relief valve 230, maintaining the latter in a closed state until the fluid pressure applied thereto exceeds the set pressure.

Figure 26:
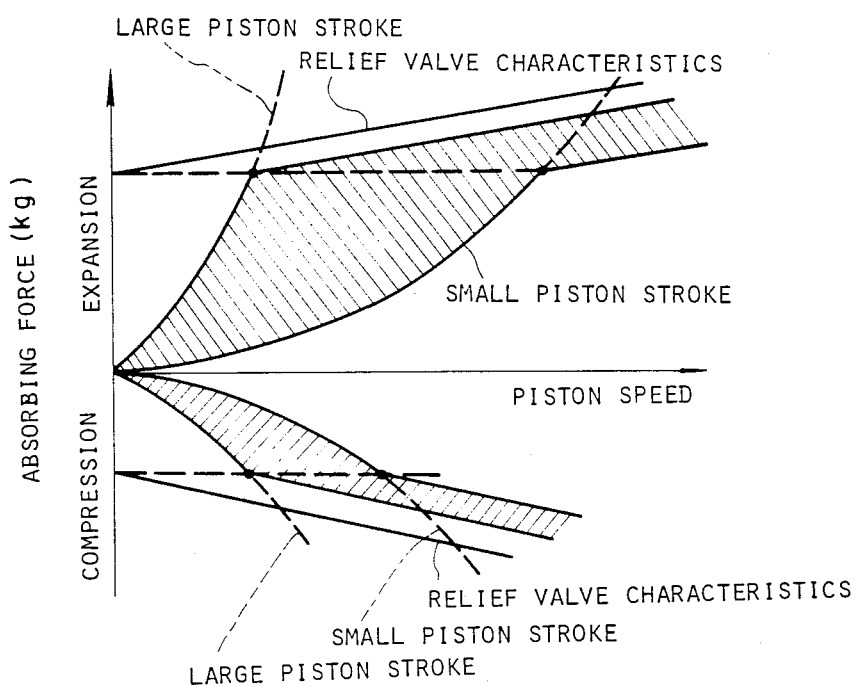
FIG. 26 is a graph showing the absorbing force variation with respect to variation of the speed of the piston, wherein the hatched areas show the working range of the shock absorber of FIG. 23.

In operation, the partitioning member 210 serves to absorb the fluid flow in the vortex chamber as illustrated in foregoing embodiment of FIGS. 21 and 22. The relief valve 230 is normally in the closed state. The relief valve 230 opens to permit fluid flow therethrough when the fluid pressure in one of the section of the vortex chamber 168 becomes greater than that of the set value. Thus, the relief valve 230 prevents the shock absorber from producing excessive absorbing force, as shown in FIG. 26. In FIG. 26, the hatched area represents the range where the shock absorber works to absorb force depending on the piston stroke and the piston speed.

Thus, the invention fullfils all of the objects and advantages sough for the invention.

It should be noted that the present invention has been described hereabove in terms of the specific embodiments of the invention. This was merely intended to show examples for embodying the present invention. Therefore, the invention should be understood to include all of the possible modifications of the embodiments without departing from the principle of the invention.

What is claimed is:

1. A hydraulic shock absorber comprising:
a hollow cylinder defining therein a fluid chamber filled with a working fluid;
a piston slidably disposed within said fluid chamber to divide the fluid chamber into upper and lower chambers and having upper and lower members assembled together for defining therein a vortex chamber, said upper and lower members being formed with vertically extending recesses on the outer periphery thereof, said recesses formed in the upper and lower members being aligned with respect to one another and defining vertical vortex passages, said piston further defining vortex passages having inner ends tangentially opening into said vortex chamber and outer ends opening into said vertical vortex passages, said vortex chamber being divided into upper and lower sections with a partition sealingly disposed within said vortex chamber, said upper and lower sections communicating with each other via said vertical vortex passages and said vortex passages, said partition being made of a flexible material and deformable in response to the fluid pressure applied thereto, said partition incorporating a relief valve for relieving the fluid pressure in said vortex chamber whereby the absorbing force produced by said vortex chamber is limited in the ranges of extreme fluid pressure, said relief valve including a pair of apertures formed in said partition and a pair of resilient members fitted on opposite surfaces of the partition, one of said resilient members closing one of said apertures on one of said opposite surfaces of the partition, and the other resilient member closing the other aperture on the other opposite surface, said resilient members providing resilient force serving as a set pressure for the relief valve; and
means for establishing communication between each of said upper and lower chambers and said vortex chamber.

2. A hydraulic shock absorber comprising:
a hollow cylinder defining therein a fluid chamber filled with a working fluid;
a piston slidably disposed within said fluid chamber to divide the fluid chamber into upper and lower chambers and defining therein a vortex chamber, said piston defining a plurality of grooves extending along an axis thereof on an outer periphery of said piston, said piston further defining a plurality of vortex passages extending through a circumferential periphery of said piston and having inner ends tangentially opening into said vortex chamber and outer ends opening, respectively, into corresponding ones of said grooves, and said vortex chamber being in communication with at least one of said upper and lower fluid chambers via said grooves and said vortex passages, and adapted to create a vortex pattern fluid flow as said working fluid in said one of said upper and lower fluid chambers flows to the other fluid chamber therethrough; and
means for establishing communication between at least the other of said upper and lower fluid chambers and said vortex chamber,
said vortex chamber being divided into upper and lower sections with a partition sealingly disposed within said vortex chamber, said upper and lower sections communicating with each other, wherein said upper chamber of said fluid chamber communicates with said upper section of said vortex chamber via said communication means and said lower chamber communicates with said lower section of said vortex chamber via said communication means, said partition being made of a flexible material and being deformable in response to the fluid pressure applied thereto, and wherein said partition incorporates a relief valve for relieving the fluid pressure in said vortex chamber, whereby the absorbing force produced by said vortex chamber is limited in the ranges of extreme fluid pressure.

3. A hydraulic shock absorber comprising:

a hollow cylinder defining therein a fluid chamber filled with a working fluid;

a piston slidably disposed within said fluid chamber to divide the fluid chamber into upper and lower chambers and defining therein a vortex chamber;

means, associated with said piston, for defining a plurality of vortex passages for communicating at least one of said upper and lower chambers and said vortex chamber and each vortex passage having a first section vertically extending along an outer periphery of said piston, and a second section extending through a circumferential periphery of said piston and having inner ends tangentially opening into said vortex chamber and outer ends opening into said first section;

said vortex chamber being in communication with said at least one of said upper and lower fluid chambers via said vortex passage and adapted to create vortex pattern fluid flow as said working fluid in said one of said upper and lower fluid chambers flows to the other fluid chamber therethrough;

means for establishing communication between at least the other of said upper and lower fluid chambers and said vortex chamber to create radial pattern fluid flow in said vortex chamber as the working fluid flows from said other fluid chamber to said one fluid chamber therethrough, said vortex chamber being divided into upper and lower sections with a partition sealingly disposed within said vortex chamber, said upper and lower sections communicating with each other, wherein said upper chamber of said fluid chamber communicates with said upper section of said vortex chamber via said communication means and said lower chamber communicates with said lower section of said vortex chamber via said communication means, said partition being made of a flexible material and being deformable in response to the fluid pressure applied thereto, and wherein said partition incorporates a relief valve for relieving fluid pressure in said vortex chamber, whereby the absorbing force produced by said vortex chamber is limited in the ranges of extreme fluid pressure.

4. A hydraulic shock absorber comprising:

a hollow cylinder defining therein a fluid chamber filled with a working fluid;

a piston slidably disposed within said fluid chamber to divide the fluid chamber into upper and lower chambers and defining therein first and second vortex chambers, said piston defining a plurality of grooves extending along an axis thereof on the outer periphery of said piston, said piston further defining vortex passages extending through a circumferential periphery of said piston and respectively having inner ends tangentially opening into said vortex chambers and outer ends opening into said grooves, and said first and second vortex chambers being in communication with each other via said grooves and said vortex passages and adapted to create vortex pattern fluid flow in one of said first and second vortex chambers as said working fluid in one of said upper and lower fluid chambers flows to the other fluid chamber therethrough; and means for establishing communication between said upper and lower fluid chambers and said first and second vortex chambers, said upper chamber of said fluid chamber communicates with said first vortex chamber via said communication means and said lower chamber communicates with said second lower section of said vortex chamber via said communication means;

said first and second vortex chambers being separated by a partition and said partition being made of a flexible material and deformable in response to fluid pressure applied thereto, wherein said partition incorporates a relief valve for relieving the fluid pressure in said vortex chambers, whereby the absorbing force produced by said vortex chambers is limited in the ranges of extreme fluid pressure.

5. A hydraulic shock absorber comprising:

a hollow cylinder defining therein a fluid chamber filled with a working fluid;

a piston slidably disposed within said fluid chamber to divide the fluid chamber into upper and lower chambers and having upper and lower members assembled together for defining therein a vortex chamber, said upper and lower members being formed with vertically extending recesses on the outer periphery thereof, the recesses formed in the upper and lower members being aligned with respect to one another and defining vertical vortex passages, said piston further defining vortex passages having inner ends tangentially opening into said vortex chamber and outer ends opening into said vertical vortex passages, said vortex chamber being divided into upper and lower sections with a partition sealingly disposed within said vortex chamber, said upper and lower sections communicating with each other via said vertical vortex passages and vortex passages, said partition being made of a flexible material and deformable in response to the fluid pressure applied thereto, and said partition incorporating a relief valve for relieving the fluid pressure in said vortex chamber, whereby the absorbing force produced by said vortex chamber is limited in the ranges of extreme fluid pressure; and means for establishing communication between each of said upper and lower chambers and said vortex chamber.

6. A hydraulic shock absorber comprising:

a hollow cylinder defining therein a fluid chamber filled with a working fluid;

a piston rod having a lower end in said hollow cylinder;

an upper piston member secured onto said lower end of said piston rod for motion therewith and having a circular cavity opening downwardly and having vertical recesses extending along the outer periphery thereof;

a lower piston member secured to the lower end of said upper piston member and constituting therewith a piston which divides the fluid chamber within said cylinder into upper and lower chambers, said lower piston member sealingly closing the lower end of said cavity of said upper piston member for defining therein a vortex chamber and having recesses in alignment with said recesses of said upper piston member, said aligned recesses defining vertical vortex passages along the internal periphery of the fluid chamber;

a pair of vortex passages provided in said upper piston member, said vortex passages tangentially opening into said vortex chamber at the inner ends thereof and opening into said vertical vortex passages at the outer ends;

said vortex chamber being divided into upper and lower sections with a partition sealingly disposed within said vortex chamber, said upper and lower sections communicating with each other via said vertical vortex passages and said pair of vortex passages, said partition being made of a flexible material and deformable in response to fluid pressure applied thereto, and said partition incorporates a relief valve for relieving the fluid pressure in said vortex chamber, whereby the absorbing force produced by said vortex chamber is limited in the ranges of extreme fluid pressure; and means for establishing communication between each of said upper and lower chambers and said vortex chamber.

7. A shock absorber as set forth in claim 5, wherein a tubular member is inserted into corresponding ones of said vertical vortex passages and said vortex passages for establishing communication between said upper and lower sections of said vortex chamber.

8. A shock absorber as set forth in claim 5 or 6, wherein said means for establishing communication between each of said upper and lower fluid chambers and said vortex chamber incorporates a fluid-pressure-responsive valve means for blocking communication between each of said upper and lower fluid chambers and said vortex chamber in response to the fluid pressure exceeding a predetermined value.

9. A shock absorber as set forth in claim 5 or 6, wherein said means for establishing communication between at least one of said upper and lower fluid chambers and said vortex chamber incorporates means for reducing the cross-sectional area permitting fluid flow, said means for reducing the area being a tubular member inserted therein.

* * * * *